United States Patent
Ishikawa et al.

(10) Patent No.: US 8,185,089 B2
(45) Date of Patent: May 22, 2012

(54) COMMUNICATION SYSTEM, STORAGE MEDIUM HAVING COMMUNICATION PROGRAM STORED THEREON, AND COMMUNICATION TERMINAL

(75) Inventors: Mikihiro Ishikawa, Kyoto (JP); Taketoshi Akimaru, Kyoto (JP); Takaki Takayama, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 570 days.

(21) Appl. No.: 11/452,399

(22) Filed: Jun. 14, 2006

(65) Prior Publication Data
US 2007/0118587 A1    May 24, 2007

(30) Foreign Application Priority Data
Nov. 10, 2005 (JP) .................... 2005-326485

(51) Int. Cl.
*H04M 1/66* (2006.01)
(52) U.S. Cl. ........ 455/411; 455/410; 713/155; 713/161; 713/168; 713/171; 713/182
(58) Field of Classification Search .......... 455/410, 455/411, 403, 422.1, 456.1–457
See application file for complete search history.

(56) References Cited

U.S. PATENT DOCUMENTS

| | | | |
|---|---|---|---|
| 6,761,638 B1 | 7/2004 | Narita | |
| 7,401,232 B2 | 7/2008 | Ono et al. | |
| 2004/0068653 A1* | 4/2004 | Fascenda | 713/168 |
| 2004/0131188 A1* | 7/2004 | Wang et al. | 380/270 |
| 2005/0054342 A1* | 3/2005 | Otsuka | 455/426.2 |
| 2006/0067290 A1 | 3/2006 | Miwa et al. | |
| 2006/0271785 A1* | 11/2006 | Holtmanns et al. | 713/171 |
| 2006/0281553 A1* | 12/2006 | Hawkins et al. | 463/42 |
| 2006/0294379 A1* | 12/2006 | Ishidoshiro | 713/171 |
| 2007/0189249 A1* | 8/2007 | Gurevich et al. | 370/338 |
| 2007/0189537 A1* | 8/2007 | Zhang et al. | 380/273 |

FOREIGN PATENT DOCUMENTS

| | | |
|---|---|---|
| JP | 2001-070658 | 3/2001 |
| JP | 2001-187271 | 7/2001 |
| JP | 2004-15725 | 1/2004 |
| JP | 2004-248232 | 9/2004 |
| JP | 2005-027853 | 2/2005 |
| JP | 2005-086421 | 3/2005 |
| JP | 3698711 | 7/2005 |

OTHER PUBLICATIONS

Kiyohito Yoshihara et al., "Server Support Approach to Zero Configuration In-Home Networking," IEICE Transactions on Communications (B), Mar. 1, 2005, vol. 447, pp. 509-520 (with partial translation).
Office Action issued on Jun. 29, 2011 in corresponding Japanese Patent Application No. 2005-326485.

* cited by examiner

*Primary Examiner* — Wayne Cai
(74) *Attorney, Agent, or Firm* — Nixon & Vanderhye PC

(57) ABSTRACT

A WEP key is generated from predetermined binary data and stored in an access point. The binary data is converted into an SSID using a predetermined conversion algorithm. The access point transmits the SSID in a beacon. A mobile game apparatus receives the SSID and recovers the binary data from the SSID using the predetermined conversion algorithm. Using the same algorithm as used for generating the WEP key, a WEP key is generated from the recovered binary data. Encrypted communication is performed between the access point and the mobile game apparatus using the WEP key.

17 Claims, 11 Drawing Sheets

COMMUNICATION SYSTEM, STORAGE MEDIUM HAVING COMMUNICATION PROGRAM STORED THEREON, AND COMMUNICATION TERMINAL

CROSS REFERENCE TO RELATED APPLICATION

The disclosure of Japanese Patent Application No. 2005-326485 is incorporated herein by reference.

TECHNICAL FIELD

Certain exemplary embodiments disclosed herein relate to wireless communication, and in particular to connection processing in wireless communication.

BACKGROUND AND SUMMARY

Conventionally, in wireless communication systems such as, for example, wireless LAN systems, encrypted communication is performed in order to improve the security level. One of encryption systems used in this field is WEP (Wired Equivalent Privacy). This is a "common key encryption system", by which the same encryption key (WEP key) is set in both the access point and the wireless LAN client. In this way, packets in communication are encrypted, and thus encrypted communication is performed. According to one method of WEP key generation, an authentication server which received a request for authentication from the wireless LAN client generates a WEP key. Then, the authentication server transmits the generated WEP key to the access point and the wireless LAN client (for example, Japanese Laid-Open Patent Publication No. 2004-15725). This allows the WEP key to be dynamically assigned and thus improves the security level.

However, the method disclosed in Japanese Laid-Open Patent Publication No. 2004-15725 has the following problem. Each time a request for authentication from the wireless LAN client is received, the authentication server generates and transmits a WEP key. When receiving authentication requests from a great number of wireless LAN clients at the same time, the authentication server needs to generate and transmit a great number of WEP keys at the same time. As a result, the processing load on the authentication server for establishing a communication connection is temporarily increased, which extends the processing time for the establishment.

Therefore, a feature of certain exemplary embodiments is to provide a communication system, a communication program, and a communication terminal capable of executing connection processing between an access point and the communication terminal easily and at a small processing load.

Certain exemplary embodiments have the following aspects to attain the feature mentioned above.

A first aspect of certain exemplary embodiments is directed to a communication system including an access point apparatus connectable to a network and a communication terminal wirelessly communicable to the access point apparatus. The access point apparatus comprises connection information storage means for storing connection information for generating key information for performing encrypted communication with the communication terminal and the key information generated from the connection information using a predetermined generation algorithm; and transmission means for transmitting the connection information. The communication terminal comprises receiving means for receiving the connection information; key information generation means for generating key information from the connection information using the same generation algorithm as used for generating the key information stored in the connection information storage means; and connection communication means for performing the encrypted communication with the access point apparatus using the key information generated by the key information generation means.

In a second aspect based on the first aspect, the connection information is character string data converted from related information including information on the access point apparatus using a predetermined conversion algorithm. The communication terminal further comprises recovery means for recovering the related information from the received connection information using the predetermined conversion algorithm; and the key information generation means generates the key information from the recovered related information.

In a third aspect based on the second aspect, the related information includes specific information which indicates that the access point apparatus is a communication target compatible with the communication terminal. The communication terminal further comprises specific information storage means for storing specific information; and determination means for determining whether or not the access point apparatus is a communication target, based on the specific information included in the related information and the specific information stored in the stored information storage means. The key information generation means generates the key information only when the determination means determines that the access point apparatus is a communication target.

In a fourth aspect based on the second aspect, the related information includes location information which indicates a location at which the access point apparatus is installed. The communication terminal further comprises communication game execution means for executing a predetermined communication game using the encrypted communication performed by the connection communication means; and content change means for changing a content of the communication game based on the location information included in the related information.

In a fifth aspect based on the second aspect, the related information includes information on the access point apparatus and random information formed of a predetermined numerical value or character string data. The key information generation means generates the key information based on the related information including the information on the access point apparatus and the random information.

A sixth aspect according to certain exemplary embodiments is directed to a communication terminal communicable with an access point apparatus having stored therein connection information, including generation information for generating key information for performing encrypted communication, and the key information generated from the connection information using a predetermined generation algorithm. The communication terminal comprises receiving means for receiving the connection information transmitted from the access point apparatus; key information generation means for generating key information from the received connection information using the predetermined algorithm; and connection communication means for performing the encrypted communication with the access point apparatus using the generated key information.

A seventh aspect of certain exemplary embodiments is directed to a storage medium having stored thereon a communication program to be executed by a communication terminal communicable with an access point apparatus, which has stored therein connection information, including generation information for generating key information for performing encrypted communication, and the key information generated from the connection information using a predetermined generation algorithm. The communication program comprises a receiving step of receiving the connection information transmitted from the access point apparatus; a key information generation step of generating key information from the received connection information using the predetermined generation algorithm; and a connection communication step of performing the encrypted communication with the access point apparatus using the generated key information.

According to the first aspect, key information can be generated by the communication terminal. Therefore, the processing load of key information generation is shared by a plurality of communication terminals and thus the load on each terminal is alleviated, as opposed to the case where the key information is generated by one server or the like. As a result, the time required for establishing the connection can be reduced. In addition, the encrypted communication can be performed without requiring the user of the communication terminal to do the settings for the encrypted communication. Since a specific type of communication terminals include key information generation means, illegal access from other types of communication terminals can be avoided.

According to the second aspect, the related information is first converted into predetermined character string data and then transmitted. The communication terminal recovers the related information and then generates the key information. Therefore, in order to perform the encrypted communication with the access point, the communication terminal needs to have means for generating the key information and also means for recovering the related information. Thus, a higher level of security is provided against illegal access from communication terminals other than the specific type of communication terminals.

According to the third aspect, erroneous connection with an access point apparatus which is not acceptable as a communication target, for example, an access point apparatus of another business entity, can be avoided.

According to the fourth aspect, the content of the communication game executed by the communication terminal can be varied for each access point apparatus connected to the communication terminal. Thus, the game can progress differently with different access point apparatuses, and the user is not bored with the game.

According to the fifth aspect, even if the access point apparatus changes the key information, the user does not need to do any corresponding setting on the communication terminal. This provides the user with an environment of easy encrypted communication. Since the key information can be changed by the access point apparatus without considering the situation of the communication terminal, the key information can be changed, for example, periodically and thus the security level can be improved.

A communication terminal and a communication program according to certain exemplary embodiments provide the same effects as those of the first aspect.

These and other features, aspects, and advantages of certain exemplary embodiments will become more apparent from the following detailed description of the exemplary embodiments when taken in conjunction with the accompanying drawings.

DETAILED DESCRIPTION

Figure 1:
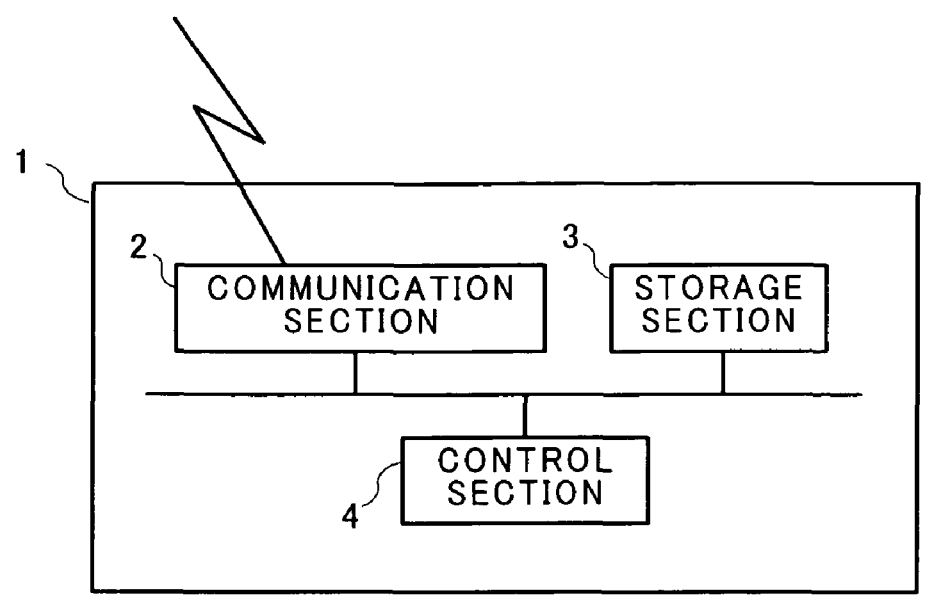
FIG. 1 is a block diagram showing an access point 1 according to an exemplary embodiment.

FIG. 1 is a block diagram showing a structure of an access point (hereinafter, referred to as an "AP") in one exemplary embodiment. As shown in FIG. 1, an AP 1 includes a communication section 2, a storage section 3, and a control section 4. The communication section 2 transmits and receives communication packets to perform wireless communication with a mobile game apparatus 10 described later. The storage section 3 stores a communication control program executable by the control section 4 or various other data required for communication, for example, a WEP key and an SSID described later. The control section 4 establishes a wireless communication link with the mobile game apparatus 1 via the communication section 2, and performs data transfer control and path selection in a network.

Figure 2:
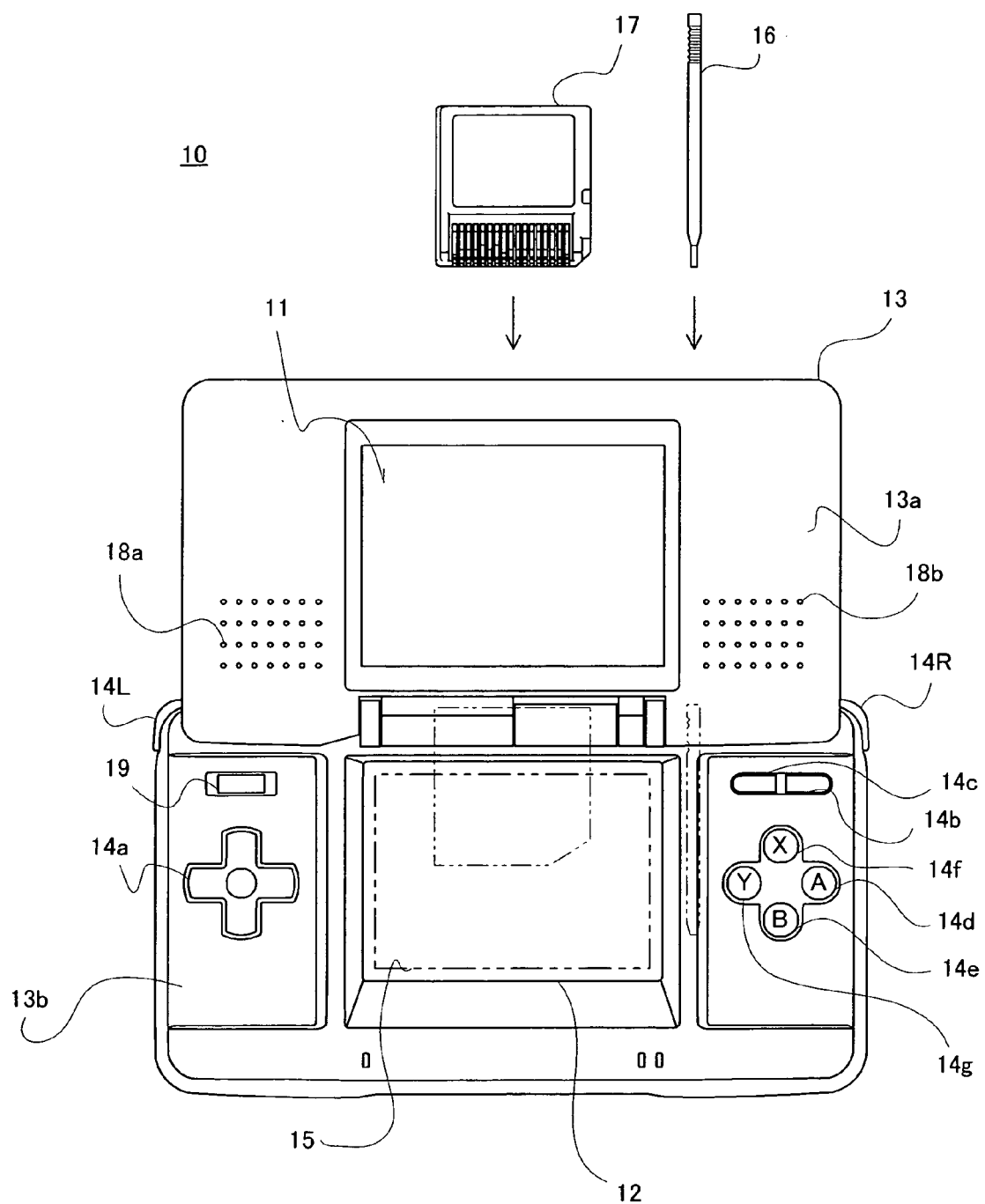
FIG. 2 is an external view of a mobile game apparatus 10 according to an exemplary embodiment.

FIG. 2 is an external view of the mobile game apparatus 10 according to an exemplary embodiment. As shown in FIG. 2, the mobile game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this exemplary embodiment, LCDs are used as display devices, but alternatively, other arbitrary display devices such as EL (Electro Luminescence) devices or the like are usable. The display devices may have any resolution.

The upper housing 13a has speaker holes 18a and 18b for releasing a sound from a pair of speakers (represented with reference numerals 30a and 30b in FIG. 2) described later.

The lower housing 13b has a cross-shaped switch 14a, a start switch 14b, a select switch 14c, an A button 14d, a B button 14e, an X button 14f, a Y button 14g, an L button 14L and an R button 14R provided thereon as input elements. A touch panel 15 is attached to a screen of the second LCD 12 as an additional input element. The lower housing 13b has a power switch 19 and insertion holes for accommodating a memory card 17 and a stick 16.

The touch panel 15 may be of any system; for example, a resistance film system, an optical (infrared) system, or a static capacitance coupling system. The touch panel 15 has a function of, when a surface thereof is touched with the stick 16, outputting coordinate set data corresponding to the position of the surface touched by the stick 16. Hereinafter, the player operates the touch panel 15 using the stick 16. Alternatively, the player may operate the touch panel 15 using a pen (stylus pen) or his/her finger instead of the stick 16. In this exemplary embodiment, the touch panel 15 has a resolution of 256 dots×192 dots (detection precision) like the second LCD 12. It is not absolutely necessary that the touch panel 15 has the same resolution as that of the second LCD 12.

The memory card 17 is a storage medium having a game program stored thereon, and is detachably attachable into the insertion hole of the lower housing 13b.

Next, with reference to FIG. 3, an internal structure of the mobile game apparatus 10 will be described.

Figure 3:
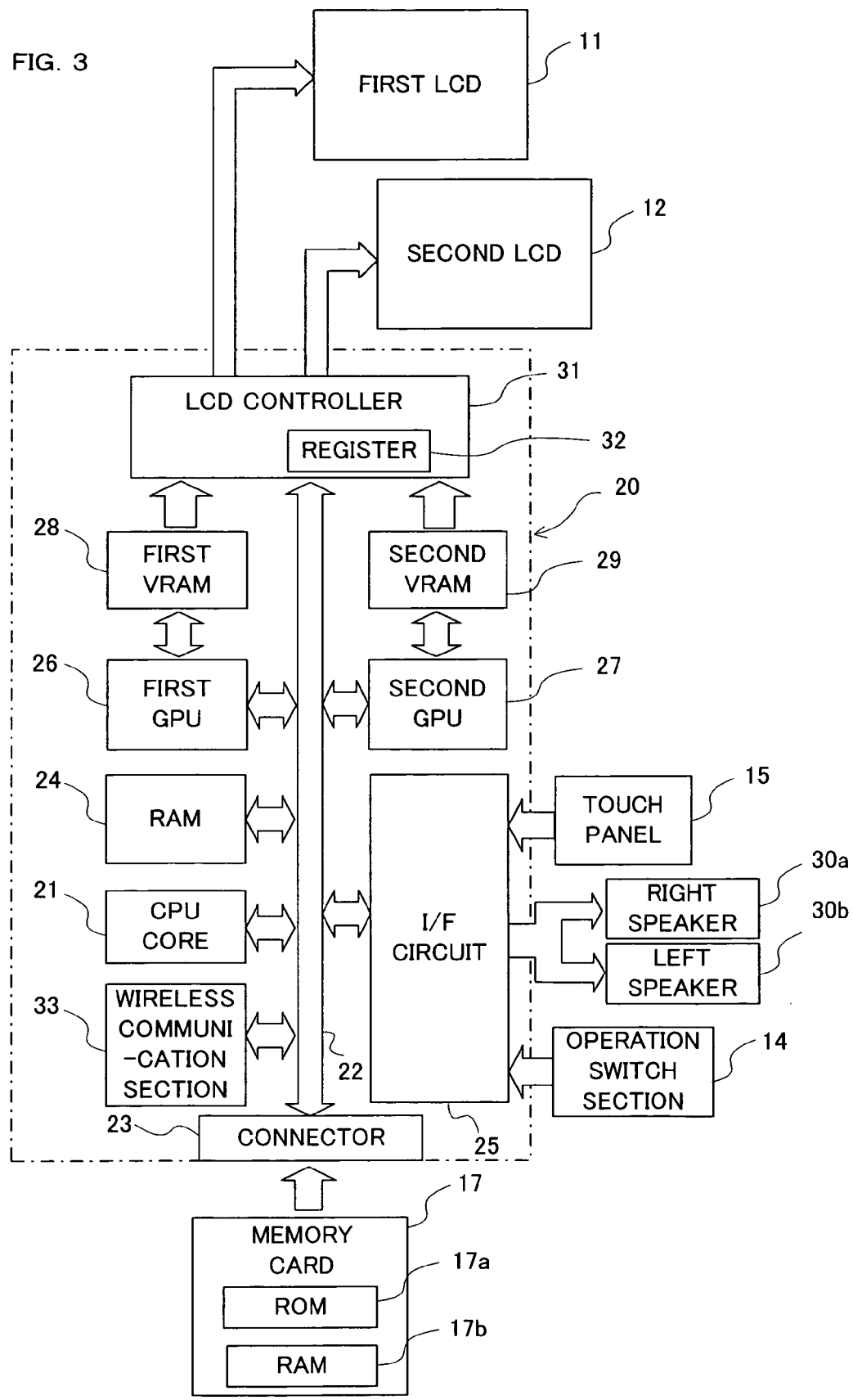
FIG. 3 is a block diagram showing an internal structure of the mobile game apparatus 10.

As shown in FIG. 3, a CPU core 21 is mounted on an electronic circuit board 20 accommodated in the housing 13. The CPU core 21 is connected to a connector 23 and is also connected to an input/output interface circuit (represented as "I/F circuit" in FIG. 2) 25, a first GPU (Graphics Processing Unit) 26, a second GPU 27, a RAM 24, an LCD controller 31, and a wireless communication section 33, via a bus 22. The memory card 17 is detachably connected to the connector 23. The memory card 17 includes a ROM 17a having a game program stored thereon and a RAM 17b having backup data rewritably stored thereon. The game program stored on the ROM 17a of the memory card 17 is loaded onto the RAM 24, and the game program loaded onto the RAM 24 is executed by the CPU core 21. The RAM 24 stores temporary data obtained by the execution of the game program by the CPU core 21 and data for generating game images, as well as the game program. The I/F circuit 25 is connected to the touch panel 15, a right speaker 30a, a left speaker 30b, and an operation switch section 14 including the cross switch 14a, the A button 14d and the like shown in FIG. 1. The right speaker 30a and the left speaker 30b are respectively located inside the speaker holes 18a and 18b.

The first GPU 26 is connected to a first VRAM (Video RAM) 28, and the second GPU 27 is connected to a second VRAM 29. In response to an instruction from the CPU core 21, the first GPU 26 generates a first game image based on the data stored on the RAM 24 for generating game images, and draws the first game image in the first VRAM 28. Similarly, in response to an instruction from the CPU core 21, the second GPU 27 generates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

The wireless communication section 33 has a function of transferring data used for game processing or other data with the AP 1 or a wireless communication section 33 of other mobile game apparatuses. For example, the wireless communication section 33 has a wireless communication function in compliance with the wireless LAN standards of IEEE802.11. The wireless communication section 33 outputs the received data to the CPU core 21. The wireless communication section 33 also transmits data instructed by the CPU core 21 to the AP 1 or other mobile game apparatuses. When a protocol such as, for example, TCP/IP (Transmission Control Protocol/Internet Protocol) or a predetermined browser is mounted on the wireless communication section 33 or a storage section of the mobile game apparatus 10, the mobile game apparatus 10 can be connected to a network such as the Internet or the like via the wireless communication section 33. Thus, the mobile game apparatus 10 can display data of documents, images, or the like published on the network, using the first LCD 11 and the second LCD 12.

In this exemplary embodiment, the above-described mobile game apparatus 10 is used as an exemplary communication target of the AP 1. The communication target according to the present invention is not limited to this, and may be a mobile information terminal having a wireless communication function, a notebook computer or the like.

Next, an overview of a communication operation between the AP 1 and the mobile game apparatus 10 assumed in this exemplary embodiment will be described. In this exemplary embodiment, the AP 1 is installed together with, for example, a test device for a TV game which is set in a toy store or the like. The mobile game apparatus 10 has a communication function as described above. A game assumed in this exemplary embodiment is a race game in which a plurality of parties can compete via the communication. A user visits the toy store with the mobile game apparatus 10. Then, the user starts the mobile game apparatus 10 and selects the "competition-via-communication mode" from the menu of the race game. The mobile game apparatus 10 attempts to establish a connection with the AP 1. When the connection is established by the processing described later, the mobile game apparatus 10 accesses a network dedicated for the race game via the AP 1 and competes against other users.

Figure 4:
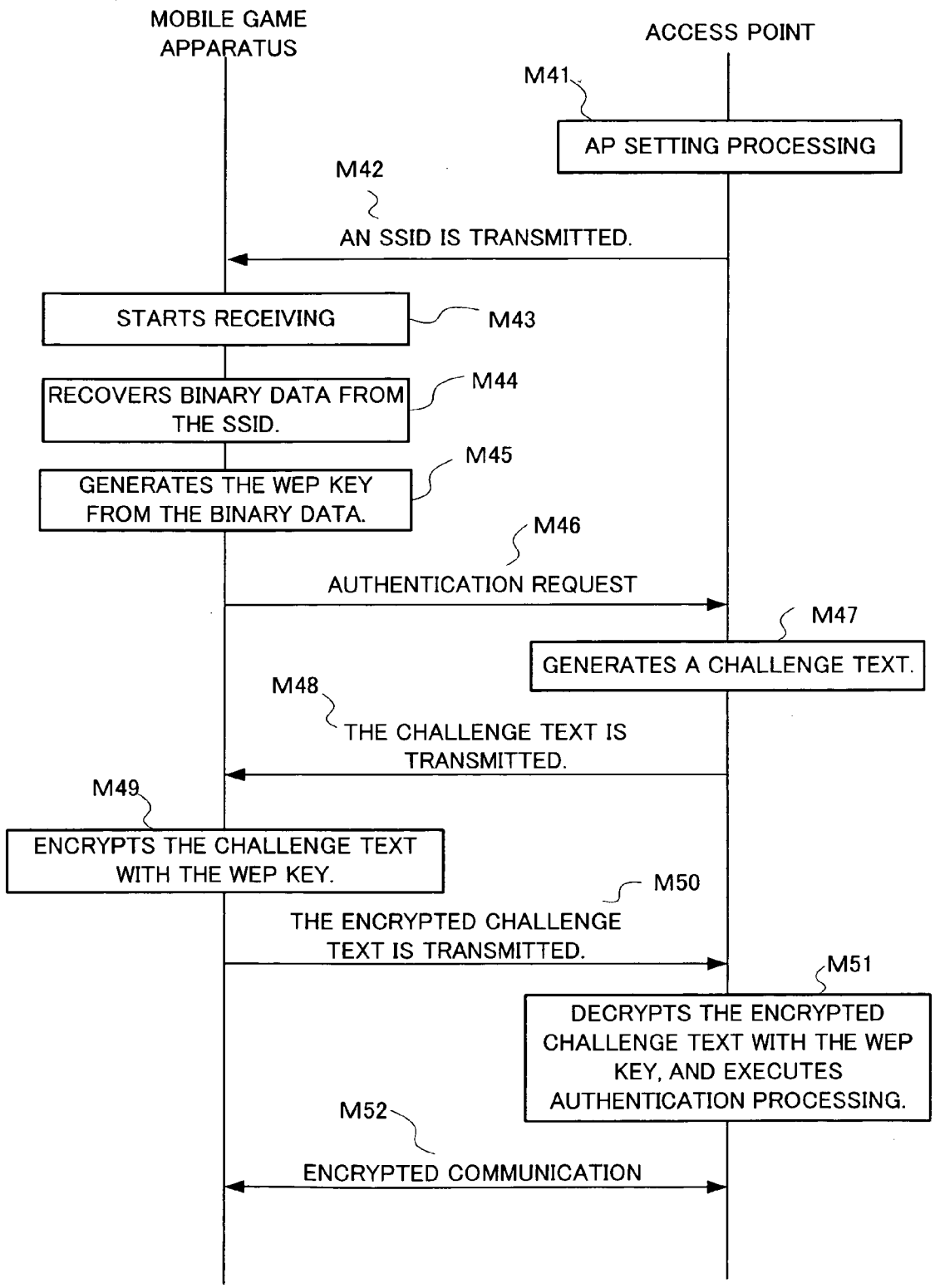
FIG. 4 is a sequence chart of a communication system according to an exemplary embodiment.

FIG. 4 is a sequence chart illustrating a flow of the communication between the AP 1 and the mobile game apparatus 10. Referring to FIG. 4, before the AP 1 is installed in the toy store, AP setting processing is executed (M41). By the AP setting processing, a WEP key is generated and stored based on predetermined binary data, and also an SSID is generated and stored based on predetermined binary data (described in detail later). The AP 1, which is installed in the toy store after the AP setting processing, periodically transmits a beacon packet (hereinafter, referred to as a "beacon") including the SSID (M42). The mobile game apparatus 10 starts receiving the beacon which is transmitted from the AP 1 (M43). When receiving the beacon, the mobile game apparatus 10 recovers the binary data from the SSID included in the beacon (M44). Next, the mobile game apparatus 10 generates a WEP key from the received binary data using the same algorithm as used for generating the WEP key in the AP setting processing (M45). Once the key WEP is generated, the mobile game apparatus 10 requests the AP 1 for authentication (M46). The AP 1 generates a challenge text (M47) and transmits the challenge text to the mobile game apparatus 10 (M48). The mobile game apparatus 10 encrypts the challenge text with the WEP key (M49), and transmits the challenge text back to the AP 1 (M50). The AP 1 determines whether or not to authenticate the mobile game apparatus 10 based on whether or not the encrypted challenge text can be decrypted using the WEP key stored in the AP 1 in the AP setting processing (M51). When the mobile game apparatus 10 is successfully authenticated, encrypted communication is performed between the AP 1 and the mobile game apparatus 10 using WEP (M52).

Figure 5:
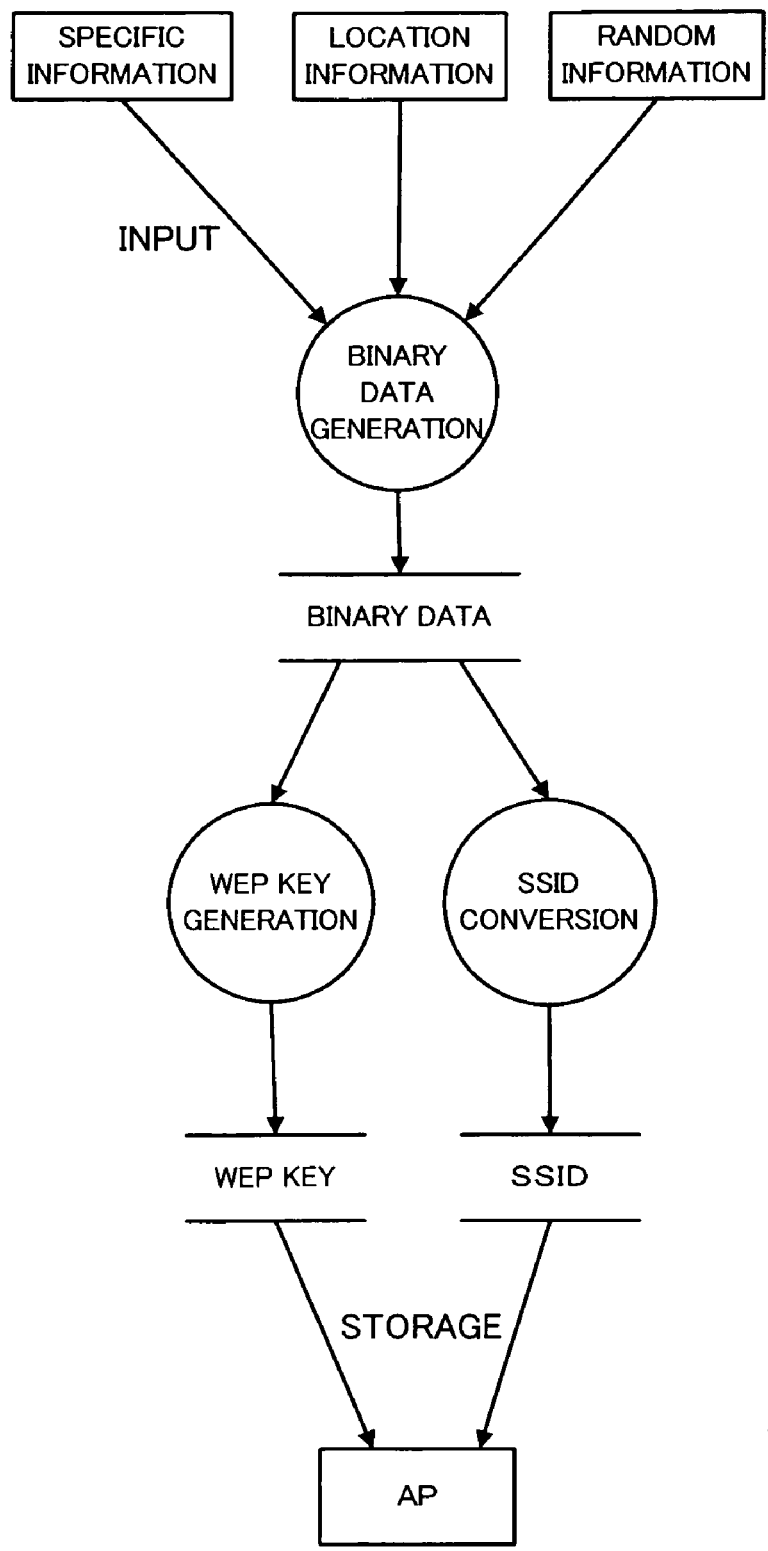
FIG. 5 shows a flow of data in AP setting processing.

Next, an overview of the AP setting processing (M41 in FIG. 4) which is executed before the AP 1 is installed in the toy store will be described. FIG. 5 shows a flow of data in the AP setting processing. Referring to FIG. 5, first, binary data generation processing is executed on a predetermined computer using three pieces of information, i.e., specific information 911, location information 912, and a random value 913, as input values. As a result, 24-byte binary data 91 is generated as described later. Next, a WEP key generation program (the same program as used in the mobile game apparatus 10) is executed on the predetermined computer using the binary data 91 as an argument. As a result, a WEP key is generated. In parallel, an SSID conversion program is executed using the binary data 91 as an argument. As a result, an SSID, which is 32-byte character string data, is generated. The WEP key and the SSID are stored in the storage section 3 of the AP 1. Thus, the AP setting processing is completed. The AP 1, after being subjected to such AP setting processing, is installed with the test device or the like in the toy store. Then, the AP 1 periodically transmits a beacon including the SSID.

Figure 6:
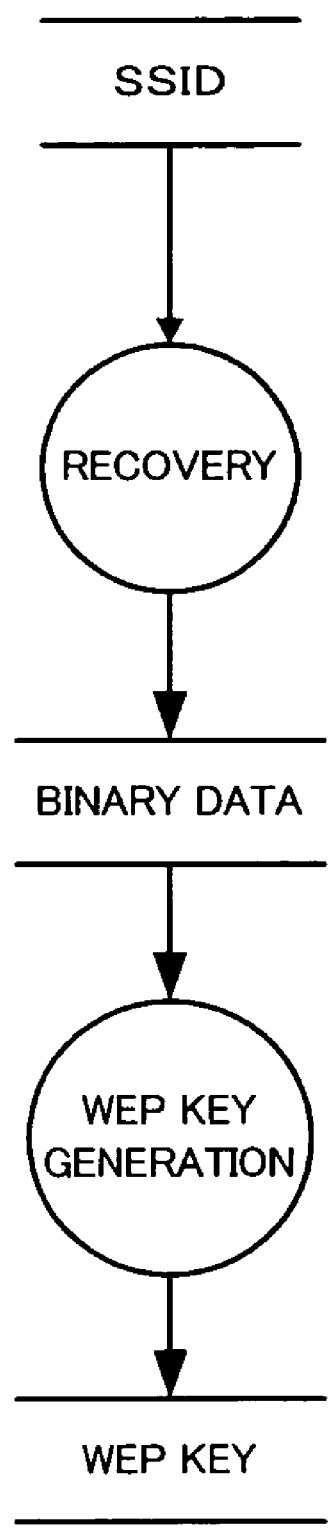
FIG. 6 shows a flow of data in the mobile game apparatus 10.

Next, an overview of an operation of the mobile game apparatus 10 will be described. As described above, the user starts the mobile game apparatus 10 and selects the "competition-via-communication mode" from the menu of the race game. Then, the mobile game apparatus 10 receives the beacon which is transmitted from the AP 1 (corresponding to M43 in FIG. 4). FIG. 6 shows a flow of data in the mobile game apparatus 10 (corresponding to M44 and M45 in FIG. 4). As shown in FIG. 6, the mobile game apparatus 10 receives the SSID from the AP 1. Next, the mobile game apparatus 10 recovers the binary data 91 from the SSID. Then, the mobile game apparatus 10 executes the WEP key generation program using the binary data 91 as an argument and thus generates a WEP key. As described above, the mobile game apparatus 10 generates the WEP key from the binary data 91 received from the AP 1. After this, the WEP key is used to execute authentication processing to determine whether or not the mobile game apparatus 10 has an authority to communicate, and also to execute race game processing to allow the mobile game apparatus 10 to compete against other players via the AP 1 (corresponding to M46 et seq. in FIG. 4).

Figure 7:
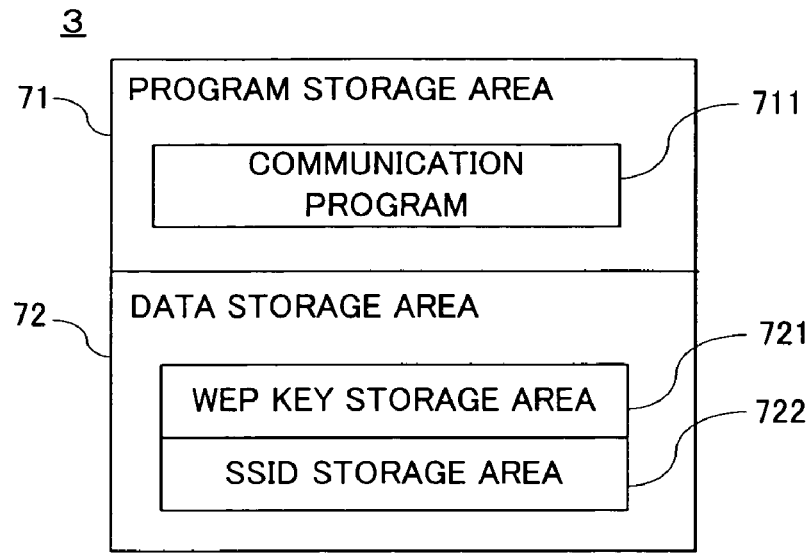
FIG. 7 is a diagram showing a memory map of a storage section 3 of the access point 1.

Now, various programs and data used in the communication processing in this exemplary embodiment will be described. FIG. 7 is a diagram showing a memory map of the storage section 3 of the AP 1 shown in FIG. 1. As shown in FIG. 7, the storage section 3 includes a program storage area 71 and a data storage area 72. The program storage area 71 stores a communication program 711. The communication program 711 controls the entire communication with communication terminals, the Internet or the like. The data storage area 72 includes a WEP key storage area 721 and an SSID storage area 722. The WEP key storage area 721 stores the WEP key generated in the AP setting processing. The SSID storage area 722 stores an SSID also generated in the AP setting processing.

Figure 8:
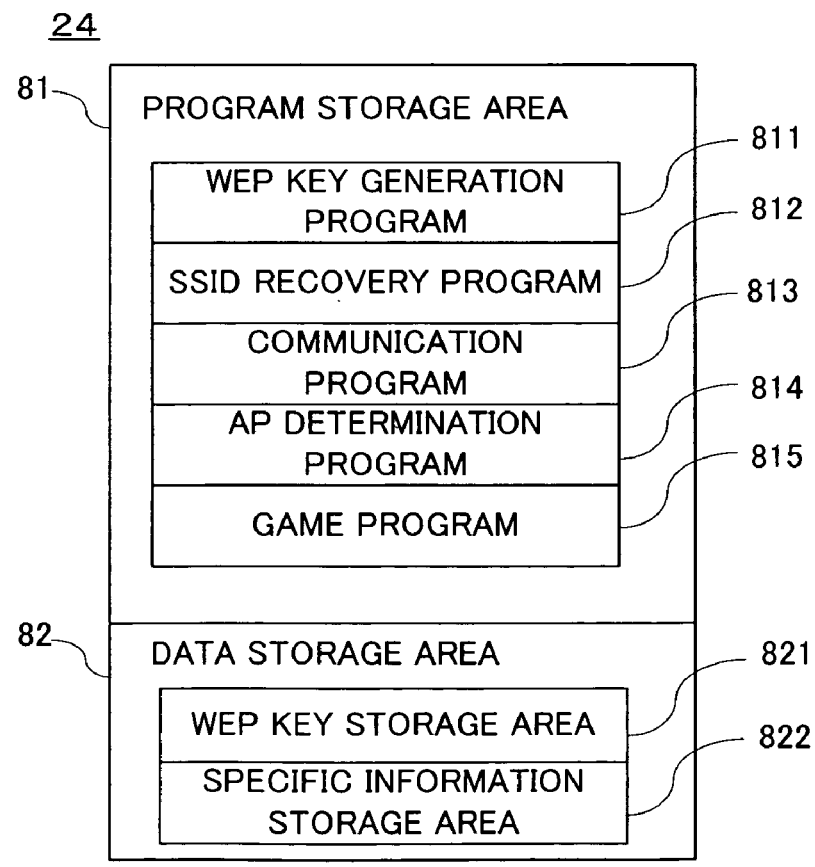
FIG. 8 is a diagram showing a memory map of a RAM 24 of the mobile game apparatus 10.

FIG. 8 is a diagram showing a memory map of the RAM 24 of the mobile game apparatus 10 shown in FIG. 3. As shown in FIG. 8, the RAM 24 includes a program storage area 81 and a data storage area 82. The program storage area 81 stores a WEP key generation program 811, an SSID recovery program 812, a communication program 813, an AP determination program 814, and a game program 815. The WEP key generation program 811 generates the WEP key using the 24-byte binary data 91 described later in detail as an argument. More specifically, the WEP key generation program 811 converts the binary data 91 into the WEP key of a predetermined length (for example, 104 bits) in accordance with a predetermined conversion system. In the case where the WEP key is used for encrypted communication, the binary data 91 is converted into a key having a predetermined total length of the length of the WEP key and 24-bit initialization vector (IV), for example, a key of 128 bits. The WEP key generation algorithm used in the WEP key generation program 811 is the same as the algorithm used for generating the WEP key in the AP setting processing. The SSID recovery program 812 recovers the binary data 91 from the SSID generated in the AP setting processing. In other words, the SSID recovery program 812 has a recovery algorithm corresponding to the conversion algorithm used in the AP setting processing for generating the SSID. The communication program 813 controls, for example, communication with the AP 1 or the communication with the Internet via the AP 1. The AP determination program 814 determines whether or not the AP of interest is acceptable as a communication target with which the mobile game apparatus 10 can establish a connection, or determines the installment location of the AP. The game program 815 executes game processing.

The data storage area 82 includes a WEP key storage area 821 and a specific information storage area 822. The WEP key storage area 821 stores the WEP key generated by the WEP key generation program 811. The specific information storage area 822 pre-stores the specific information (keyword) 911 (described later).

Figure 9:
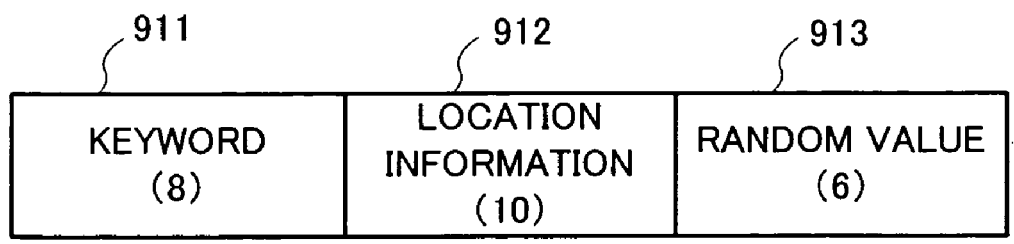
FIG. 9 shows an example of a data structure of binary data.

FIG. 9 shows an example of a data structure of the binary data 91, based on which the WEP key and the SSID are generated. The binary data 91 is 24-byte data including the specific information 911, the location information 912, and the random value 913. The specific information 911 is 8-byte data, which indicates whether or not an AP with which the mobile game apparatus 10 is attempting to establish connection compatible with the mobile game apparatus 10; i.e., such an AP is acceptable as a communication target of the mobile game apparatus 10. For example, where such an AP belongs to another business entity, the AP is not acceptable as a communication target. The specific information 911 is, for example, a vendor ID. The location information 912 is 10-byte data, which indicates the location at which the AP 1 is installed. The random value 913 is 6-byte data, which is used for changing the WEP key. As described above, the WEP key is generated using the entire binary data 91 as an argument. Therefore, a different WEP key can be generated by changing the random value 913.

Figure 10:
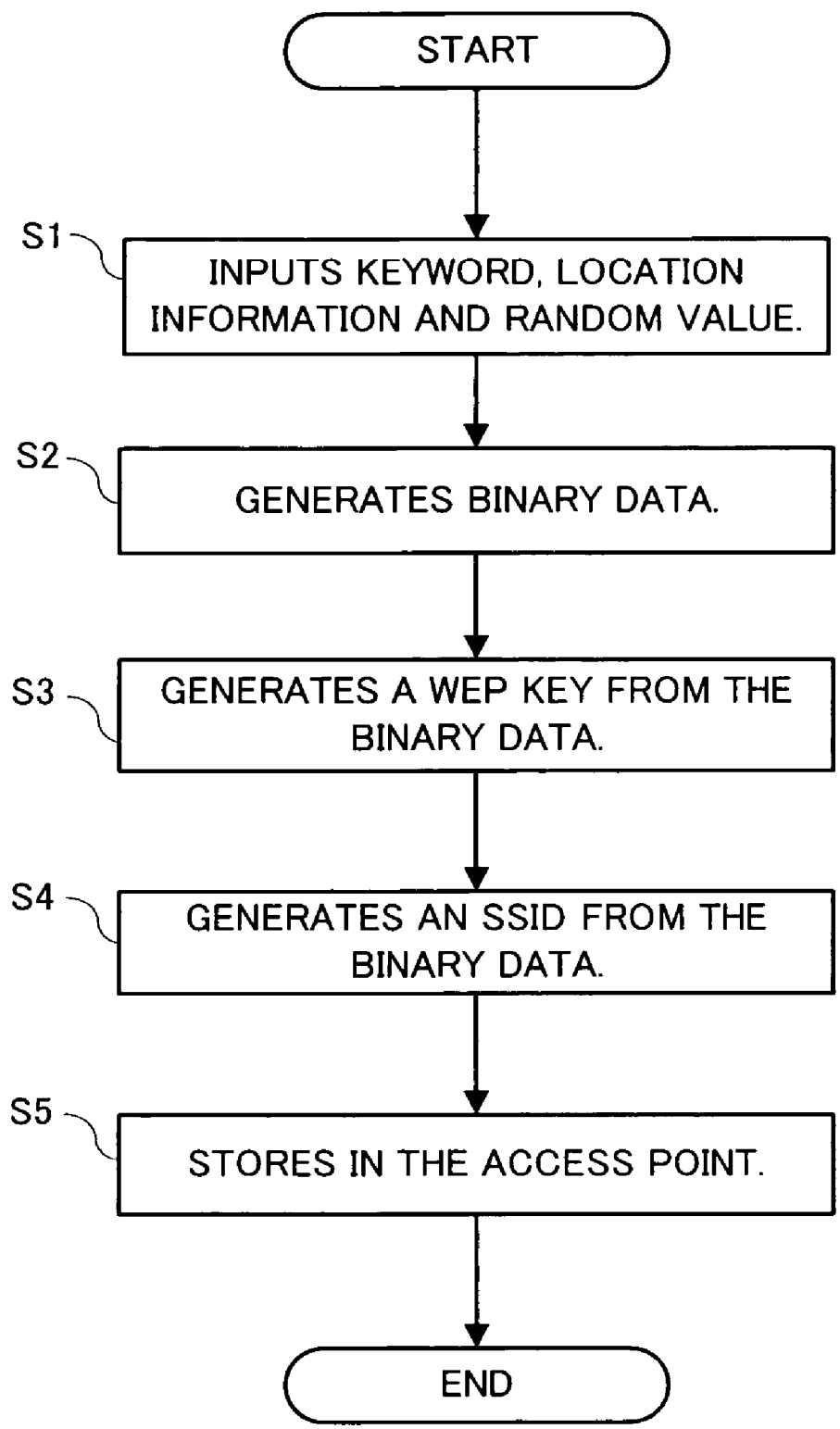
FIG. 10 is a flowchart illustrating a flow of the AP setting processing.

Hereinafter, the communication processing executed between the AP 1 and the mobile game apparatus 10 will be described in detail. First, the operation performed by the AP 1 will be described. Before the AP 1 is installed in the toy store, the above-described AP setting processing is executed. FIG. 10 is a flowchart illustrating the AP setting processing executed on the predetermined computer in detail. Referring to FIG. 10, three pieces of information, i.e., the specific information 911, the location information 912 and the random value 913 are input on the predetermined computer (step S1). Next, binary data generation processing is executed using the three pieces of information as the input values (step S2). As a result, the 24-byte binary data 91 is generated.

Then, the above-described WEP key generation program 811 (the same program as used in the mobile game apparatus 10) is executed by the predetermined computer using the binary data 91 as an argument, thereby generating a WEP key (step S3). In parallel, the SSID conversion program is executed using the binary data 91 as an argument, thereby generating an SSID as 32-byte character string data (step S4). More specifically, the SSID is generated by replacing the binary data 91 with characters in accordance with a predetermined rule (for example, Base64, etc.; but preferably, a unique rule). The generated WEP key and SSID are stored in the storage section 3 of the AP 1 (step S5). Thus, the AP setting processing is completed.

The AP 1, which is set in this manner, is installed in the toy store or the like. Then, the AP 1 periodically transmits the beacon. When the random value 913 is changed in order to change the WEP key as described above, binary data 91 is newly generated so as to reflect the post-change random value 913. Also, a WEP key and an SSID are newly generated using the post-change binary data 91, and stored in the AP 1.

Figure 11:
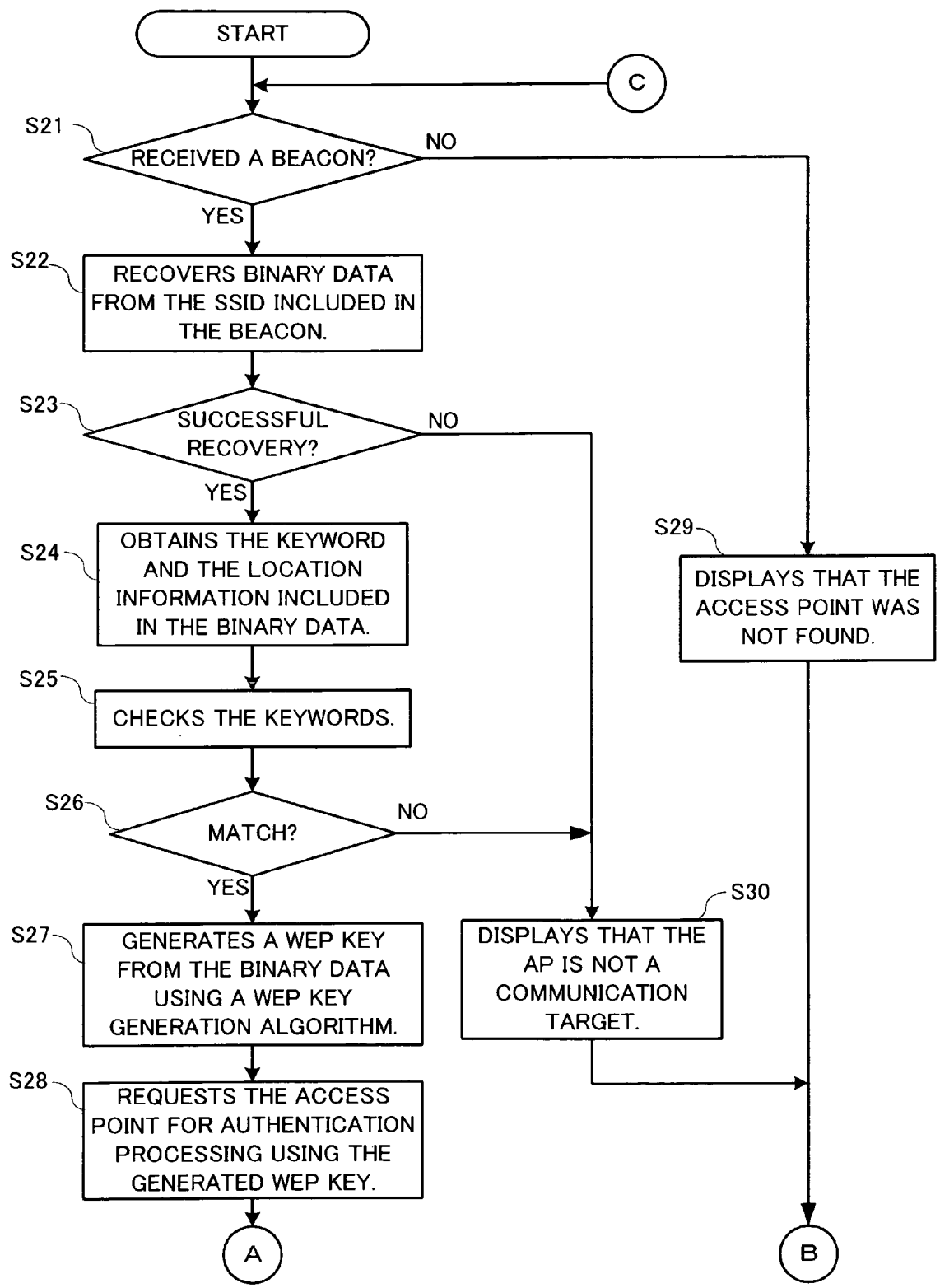
FIG. 11 is a flowchart illustrating a flow of communication processing executed by the mobile game apparatus 10.
Figure 12:
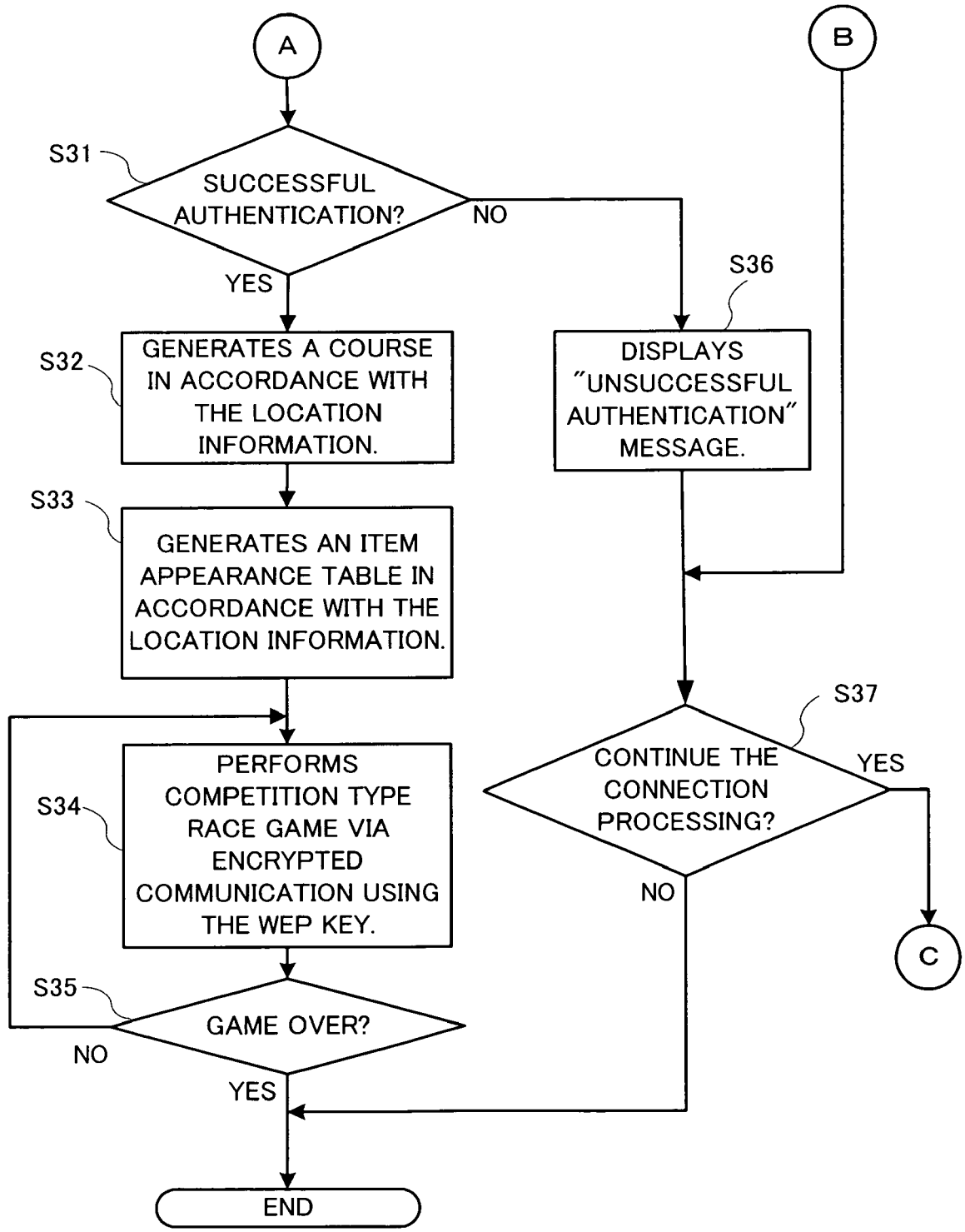
FIG. 12 is a flowchart illustrating a flow of the communication processing executed by the mobile game apparatus 10.

Next, the communication processing executed by the mobile game apparatus 10 will be described in detail. FIG. 11 and FIG. 12 are a flowchart illustrating a flow of the communication processing executed by the mobile game apparatus 10. First, the user takes the mobile game apparatus 10 to the toy store where the AP 1 is installed, and starts the mobile game apparatus 10. When the mobile game apparatus 10 is started, a menu of a race game is displayed. The user selects the "competition-via-communication mode" from the menu. Thus, the processing shown in FIG. 11 is started.

Referring to FIG. 11, the CPU core 21 causes the wireless communication section 33 to attempt to receive a beacon for a predetermined time duration, and determines whether or not the beacon has been received (step S21). When it is determined that the beacon was not received within the predetermined time duration (NO in step S21), the CPU core 21 displays an inquiry on whether or not the user intends to continue the connection processing, for example, "No access point was found. Try the connection processing again?", and waits for an instruction from the user (step S29). When the instruction from the user is input, the CPU core 21 determines whether or not the instruction is to continue the connection processing (step S37 in FIG. 12). When it is determined that the instruction is to continue the connection processing (YES in step S37), the CPU core 21 returns the processing to step S21 and repeats the above-described processing. When it is determined that the instruction is not to continue the connection processing (NO in step S37), the CPU core 21 terminates the communication processing and returns the screen to the menu of the game.

When it is determined in step S21 that the beacon was received within the predetermined time duration (YES in step S21), the CPU core 21 extracts the SSID from the beacon and executes the SSID recovery program 812 using the SSID as an argument. As a result, the binary data 91 is recovered from the SSID included in the received beacon (step S22). As described above, the SSID recovery program 812 has a recovery algorithm corresponding to the conversion algorithm used for generating the SSID in the AP setting processing. Therefore, the binary data can be recovered by "reverse-converting" the SSID. The SSID recovery program 812 has, for example, a checksum, and therefore notifies the CPU core 21 of a return value which indicates whether or not the binary data 91 was normally recovered (for example, return value=0: normal termination; return=1: abnormal termination).

Based on the return value notified in step S22, the CPU core 21 determines whether or not the recovery processing in step S22 was successful (step S23). When the recovery processing is determined to be unsuccessful (NO in step S23), the CPU core 21 determines that the AP 1 is not compatible with the mobile game apparatus 10 and displays such a message in the LCD 12 (step S30). This occurs when, for example, when the mobile game apparatus 10 receives a beacon from an AP of another business entity which is not compatible for the communication with the mobile game apparatus 10 in this exemplary embodiment. After step S30, the CPU core 21 advances the processing to step S37 described above.

When it is determined in step S23 that the binary data 91 was successfully recovered (YES in step S23), the CPU core 21 obtains the specific information 911 and the location information 912 from the binary data 91 (step S24). Then, the CPU core 21 checks the specific information 911 obtained in step S24 against with the specific information pre-stored in the specific information storage area 822 of the mobile game apparatus 10 (step S25), and determines whether or not the two pieces of specific information match each other (step S26). When the two pieces of specific information do not match each other (NO in step S26), the CPU core 21 advances the processing to step S30 described above. In this case also, the AP 1 is not acceptable as a communication target of the mobile game apparatus 10 for the reason that, for example, the AP 1 is an AP of another business entity which is not compatible with the mobile game apparatus 10.

When the two pieces of specific information match each other (YES in step S26), the AP 1 is determined to be an AP acceptable as a communication target of the mobile game apparatus 10. Therefore, the CPU core 21 advances the processing to step S27. In step S27, WEP key generation processing is executed. More specifically, the CPU core 21 executes the WEP key generation program 811 using the recovered binary data 91 as an argument. The WEP key generation program 811 has the same algorithm as used for generating the WEP key in the AP setting processing. Therefore, the same WEP key as stored in the AP 1 is generated as a result of using the same binary data 91 as an argument.

Then, the CPU core 21 executes WEP authentication processing with respect to the AP 1, using the WEP key generated in step S27 and the SSID (step S28). Namely, the WEP authentication processing with respect to the AP 1 which has the same SSID as received by the mobile game apparatus 10. The WEP authentication processing is executed using the authentication system as described above with reference to FIG. 4, by which a challenge text is transmitted from the AP 1 and the mobile game apparatus 10 encrypts the challenge text using the WEP key and transmits the challenge text back to the AP 1.

Then, it is determined whether or not the mobile game apparatus 10 was authenticated by the AP 1 as a result of the WEP authentication processing in step S28 (step S31 in FIG. 12). When the mobile game apparatus 10 was not authenticated (NO in step S31), the CPU core 21 displays a message that the authentication failed on the LCD 12 (step S36), and advances the processing to step S37. When the mobile game apparatus 10 was authenticated (YES in step S31), the connection is established between the mobile game apparatus 10 and the AP 1. When the connection is established, race game processing is started. First, a course on which the race is to be performed is selected based on the location information 912 obtained in step S24 (step S32). More specifically, a code given to each region at which an AP is installed (region code) is assigned to the first six bytes of the location information 912, and a code given to each store in which an AP is installed (store code) is assigned to the last four bytes of the location information 912. In accordance with the region code, a snow mountain course, a beach course or the like is selected as the course of the race (step S32). Next, an item appearance table is set regarding items appearing during the race (step S33). More specifically, based on the region code or the store code, the item appearance table is set such that, for example, products specifically available in the region where the store having the AP 1 is installed appear as items. Then, the competition type race game is played via the encrypted communication between the mobile game apparatus 10 and the AP 1 using the WEP key (step S34). Next in step S35, it is determined whether or not the game is to be over. When the game is to be over (YES in step S35), the CPU core 21 disconnects the communication and terminates the game processing. When the game is not to be over (NO in step S35), the CPU core 21 causes the processing to return to step S34 and repeats the game processing. Thus, the communication processing executed by the mobile game apparatus 10 is completed.

In the above-described exemplary embodiment, information necessary for establishing the connection with the access point can be generated based on the information transmitted from the access point. This spares the authentication server the extra processing load even when a great number of communication terminals are attempting to establish a connection with the network at the same time, and therefore reduces the time required for the connection establishment. The user is also spared the trouble of doing complicated settings for the connection regarding the WEP key or the like, and can easily use the encrypted communication with the AP 1. The keyword checking procedure allows the communication terminal to determine whether or not the AP is acceptable as a communication target, and thus can prevents erroneous connection establishment with an AP which is not acceptable as a communication target. When the WEP key is changed by the AP using the random value, the post-change binary data is transmitted and received as an SSID and a post-change WEP key is generated from the SSID. Therefore, the user can use the encrypted communication without being bothered by the change of the WEP key on the AP side and without being required to change any setting on the mobile game apparatus 10.

In the above exemplary embodiment, the location information 912 is used as one parameter required for the game processing. Therefore, how the game progresses may be changed in accordance with the location at which the AP 1 is installed. Thus, the game played on the communication terminal can progress differently with different APs, and the user is not bored with the game.

In the above exemplary embodiment, the connection processing is started when the user selects the "competition-via-communication mode". Alternatively, the connection processing may be automatically started or terminated in accordance with the progress of the game. In this case, the user can use applications using the network, such as a game, with no need to do any operation for the connection processing.

In the case where it is not necessary to individually identify the AP, the location information 912 is not necessary. In this case, the binary data 91 may not be generated in the AP setting processing. Specifically, in the AP setting processing, an SSID is generated by combining the specific information 911 and the random value 913 as character string data, and a WEP key is generated from the SSID. The SSID and the WEP key are stored in the AP, and the AP transmits the SSID. The mobile game apparatus 10 may execute the WEP key generation program using the received SSID as an argument, without recovering the binary data from the SSID. This reduces the processing load on the mobile game apparatus 10.

While the invention has been described in detail, the foregoing description is in all aspects illustrative and not restrictive. It is understood that numerous other modifications and variations can be devised without departing from the scope of the invention.

What is claimed is:

1. A communication system including an access point apparatus connectable to a network and a communication terminal wirelessly communicable to the access point apparatus, wherein:
the access point apparatus comprises:
a connection information storage location for storing connection information and key information for performing encrypted communication with the communication terminal, the key information being generated using a predetermined generation algorithm from the connection information or from related information for generating the connection information; and
transmission programmed logic circuitry configured to transmit the connection information; and
the communication terminal comprises:
receiving programmed logic circuitry configured to receive the connection information;
key information generation programmed logic circuitry configured to generate key information from the connection information using the same generation algorithm as used for generating the key information stored in the connection information storage location; and
connection establishing programmed logic circuitry configured to establish a connection for the encrypted communication with the access point apparatus using the key information generated by the key information generation programmed logic circuitry,
wherein said key information is generated prior to performing any encrypted communication with the communication terminal, and
wherein communication between the communication terminal and the access point apparatus is established and performed without using an authentication server.

2. The communication system according to claim 1, wherein:
the connection information is character string data converted from related information including information on the access point apparatus using a predetermined conversion algorithm; and
the communication terminal further comprises recovery programmed logic circuitry configured to recover the related information from the received connection information using the predetermined conversion algorithm; and
the key information generation programmed logic circuitry is further configured to generate the key information from the recovered related information.

3. The communication system according to claim 2, wherein:
the related information includes specific information which indicates that the access point apparatus is a communication target compatible with the communication terminal;
the communication terminal further comprises:
a specific information storage location for storing specific information; and
determination programmed logic circuitry configured to determine whether or not the access point apparatus is a communication target, based on the specific information included in the related information and the specific information stored in the stored information storage locations; and
the key information generation programmed logic circuitry is further configured to generate the key information only when the determination programmed logic circuitry determines that the access point apparatus is a communication target.

4. The communication system according to claim 2, wherein:
the related information includes location information which indicates a location at which the access point apparatus is installed; and
the communication terminal further comprises:
communication game execution programmed logic circuitry configured to execute a predetermined communication game using the encrypted communication performed by the connection communication programmed logic circuitry; and content change programmed logic circuitry configured to change a content of the communication game based on the location information included in the related information.

5. The communication system according to claim 2, wherein:

the related information includes information on the access point apparatus and random information formed of a predetermined numerical value or character string data; and the key information generation programmed logic circuitry is further configured to generate the key information based on the related information including the information on the access point apparatus and the random information.

6. A communication terminal communicable with an access point apparatus having stored therein connection information or related information for generating the connection information, including generation information for generating key information for performing encrypted communication, and the key information generated, using a predetermined generation algorithm, from the connection information or the related information, the communication terminal comprising:

receiving programmed logic circuitry configured to receive the connection information transmitted from the access point apparatus;

key information generation programmed logic circuitry configured to generate key information from the received connection information using the predetermined algorithm; and connection establishment programmed logic circuitry configured to establish a connection for the encrypted communication with the access point apparatus using the generated key information, wherein said key information is generated prior to performing any encrypted communication with the communication terminal, and wherein any communication between the communication terminal and the access point apparatus is established and performed without using an authentication server.

7. The communication terminal according to claim 6, wherein:

the connection information is character string data converted from related information including information on the access point apparatus using a predetermined conversion algorithm; and the communication terminal further comprises recovery programmed logic circuitry configured to recover the related information from the received connection information using the predetermined conversion algorithm; and the key information generation programmed logic circuitry is further configured to generate the key information from the recovered related information.

8. The communication terminal according to claim 7, wherein:

the related information includes specific information which indicates that the access point apparatus is a communication target compatible with the communication terminal;

the communication terminal further comprises:

a specific information storage location for storing specific information; and determination programmed logic circuitry configured to determine whether or not the access point apparatus is a communication target, based on the specific information included in the related information and the specific information stored in the stored information storage locations; and the key information generation programmed logic circuitry is further configured to generate the key information only when the determination programmed logic circuitry determines that the access point apparatus is a communication target.

9. The communication terminal according to claim 7, wherein:

the related information includes location information which indicates a location at which the access point apparatus is installed; and the communication terminal further comprises:

communication game execution programmed logic circuitry configured to execute a predetermined communication game using the encrypted communication performed by the connection communication programmed logic circuitry; and content change programmed logic circuitry configured to change a content of the communication game based on the location information included in the related information.

10. The communication terminal according to claim 7, wherein:

the related information includes information on the access point apparatus and random information formed of a predetermined numerical value or character string data; and the key information generation programmed logic circuitry is further configured to generate the key information based on the related information including the information on the access point apparatus and the random information.

11. A non-transitory storage medium having stored thereon a communication program to be executed by a communication terminal communicable with an access point apparatus, which has stored therein connection information or related information for generating the connection information, including generation information for generating key information for performing encrypted communication, and the key information generated, using a predetermined generation algorithm, from the connection information or the related information, the communication program comprises instructions that, when executed by a computer, perform a method comprising:

receiving the connection information transmitted from the access point apparatus;

generating key information from the received connection information using the predetermined generation algorithm; and establishing a connection for the encrypted communication with the access point apparatus using the generated key information, wherein said key information is generated prior to performing any encrypted communication with the communication terminal, and wherein said method does not involve an authentication server.

12. The non-transitory storage medium according to claim 11, wherein:

the connection information is character string data converted from related information including information on the access point apparatus using a predetermined conversion algorithm; and the communication program further comprises instructions for:

recovering the related information from the received connection information using the predetermined conversion algorithm; and generating the key information from the recovered related information.

13. The non-transitory storage medium according to claim 12, wherein:

the related information includes specific information which indicates that the access point apparatus is a communication target compatible with the communication terminal;

the communication program further comprises instructions for:

storing specific information in a specific information storage location; and determining whether or not the access point apparatus is a communication target, based on the specific information included in the related information and the specific information stored in the stored information storage locations; and generating the key information only when it is determined that that the access point apparatus is a communication target.

14. The non-transitory storage medium according to claim 12, wherein:

the related information includes location information which indicates a location at which the access point apparatus is installed; and the communication program further comprises instructions for:

executing a predetermined communication game using the encrypted communication; and changing a content of the communication game based on the location information included in the related information.

15. The non-transitory storage medium according to claim 12, wherein:

the related information includes information on the access point apparatus and random information formed of a predetermined numerical value or character string data; and the communication program further comprises instructions for generating the key information based on the related information including the information on the access point apparatus and the random information.

16. A communications method to be executed by a communication terminal communicable with an access point apparatus, which has stored therein connection information or related information for generating the connection information, including generation information for generating key information for performing encrypted communication, and the key information generated, using a predetermined generation algorithm, from the connection information or the related information, the method comprising:

receiving the connection information transmitted from the access point apparatus;

generating key information from the received connection information using the predetermined generation algorithm; and establishing a connection for the encrypted communication with the access point apparatus using the generated key information, wherein said key information is generated prior to performing any encrypted communication with the communication terminal, and wherein said method does not involve an authentication server.

17. A communication system including an access point apparatus connectable to a network and one or more communication terminals wirelessly communicable to the access point apparatus, wherein:

the access point apparatus comprises:

a connection information storage location for storing connection information and key information for performing encrypted communication with the one or more communication terminals, the key information being generated using a predetermined generation algorithm from the connection information or from related information for generating the connection information, and transmission programmed logic circuitry configured to transmit the connection information; and receiving programmed logic circuitry configured to receive the connection information;

key information generation programmed logic circuitry configured to generate key information from the connection information using the same generation algorithm as used for generating the key information stored in the connection information storage location; and connection establishing programmed logic circuitry configured to establish a connection for the encrypted communication with the access point apparatus using the key information generated by the key information generation programmed logic circuitry, wherein said key information is generated prior to performing any encrypted communication with the communication terminal, and wherein communication between the one or more communication terminals and the access point apparatus is established and performed without using an authentication server.

* * * * *